US009265100B2

(12) United States Patent
Nakano et al.

(10) Patent No.: US 9,265,100 B2

(45) Date of Patent: Feb. 16, 2016

(54) DRIVING CIRCUIT OF SEMICONDUCTOR-TYPE LIGHT SOURCE FOR VEHICLE LIGHTING DEVICE AND A VEHICLE LIGHTING DEVICE

(75) Inventors: Katsuaki Nakano, Isehara (JP); Masateru Hayashi, Isehara (JP)

(73) Assignee: ICHIKOH INDUSTRIES, LTD., Isehara-Shi (JP)

( * ) Notice: Subject to any disclaimer, the term of this patent is extended or adjusted under 35 U.S.C. 154(b) by 300 days.

(21) Appl. No.: 13/013,191

(22) Filed: Jan. 25, 2011

(65) Prior Publication Data

US 2011/0181186 A1 Jul. 28, 2011

(30) Foreign Application Priority Data

Jan. 27, 2010 (JP) ................................ 2010-015926

(51) Int. Cl.
*B60L 1/14* (2006.01)
*H05B 33/08* (2006.01)

(52) U.S. Cl.
CPC .................................. *H05B 33/0806* (2013.01)

(58) Field of Classification Search
CPC ...... B60Q 1/00; B60Q 1/0088; B60Q 1/0094; H01L 33/00; B60L 1/14; F21V 15/01
USPC ........ 315/77, 82, 185 R, 291; 307/10.1, 10.8; 362/487, 488, 546, 800; 257/99
See application file for complete search history.

(56) References Cited

U.S. PATENT DOCUMENTS

| | | | | |
|---|---|---|---|---|
| 6,346,777 | B1 | 2/2002 | Kim | |
| 6,932,498 | B2 * | 8/2005 | Miyazaki | 362/545 |
| 7,033,043 | B2 * | 4/2006 | Asao et al. | 362/240 |
| 7,049,759 | B2 * | 5/2006 | Roach | 315/224 |
| 8,294,162 | B2 * | 10/2012 | Nakajima | 257/88 |

FOREIGN PATENT DOCUMENTS

| | | | |
|---|---|---|---|
| DE | 10 2008 033 176 | A1 | 1/2010 |
| EP | 1 482 241 | B1 | 12/2004 |
| JP | 5-129734 | A | 5/1993 |
| JP | 5-45812 | U | 6/1993 |
| JP | 2004-034742 | A | 2/2004 |
| JP | 2010-015887 | A | 1/2010 |

* cited by examiner

*Primary Examiner* — Thuy Vinh Tran

(74) *Attorney, Agent, or Firm* — Foley & Lardner LLP

(57) ABSTRACT

In a conventional driving circuit, it has been inefficient and difficult to measure, classify, and rank (Vf) characteristics of a light emitting element that is in a bare-chip state. According to the present invention, a semiconductor-type light source is made of four light emitting chips (41 to 44) that are in a bare-chip state, the light emitting chips being randomly mounted on a board (3) without classifying (Vf) characteristics in advance. As the resistors, opening resistors (R2, R4, R6) and trimming resistors (R1, R3, R5) are disposed in parallel and then are connected in series to the four light emitting chips. Values of the resistors are adjusted so that a predetermined set current value or luminous flux value is reliably obtained with respect to the four light emitting chips. As a result, the present invention is capable of efficiently and easily mounting the four light emitting elements (41 to 44) and the resistors (R1 to R7) on the board (3).

9 Claims, 8 Drawing Sheets

FIG.4

| RANK | R1 | R2 | R3 | R4 | R5 | R6 | R7 | COMBINED RESISTANCE | |
|---|---|---|---|---|---|---|---|---|---|
| A | 11.5 | OPEN | TRIMMING 14.4 | OPEN | TRIMMING 14.4 | OPEN | TRIMMING 11.7 | 52.0 | MAX 57.6 |
| B | 11.5 | 10 | TRIMMING 14.4 | OPEN | TRIMMING 14.4 | OPEN | TRIMMING 11.9 | 46.0 | |
| C | 11.5 | 10 | TRIMMING 14.4 | 10 | TRIMMING 14.4 | OPEN | TRIMMING 14.3 | 40.0 | |
| D | 11.5 | 10 | 11.5 | 10 | 11.5 | OPEN | TRIMMING 11.8 | 34.0 | |
| E | 11.5 | 10 | 11.5 | 10 | 11.5 | 10 | 12 | 28.0 | MIN 26.0 |

DRIVING CIRCUIT OF SEMICONDUCTOR-TYPE LIGHT SOURCE FOR VEHICLE LIGHTING DEVICE AND A VEHICLE LIGHTING DEVICE

CROSS REFERENCE TO RELATED APPLICATIONS

This application claims priority of Japanese Patent Application No. 2010-15926 filed on Jan. 27, 2010. The contents of this application are incorporated herein by reference in their entirety.

BACKGROUND OF THE INVENTION

1. Field of the Invention

The present invention relates to a driving circuit of semiconductor-type light source for vehicle lighting device using a semiconductor-type light source as a light source. In addition, the present invention relates to a vehicle lighting device using a semiconductor-type light source as a light source.

2. Description of the Related Art

A driving circuit of semiconductor-type light source for vehicle lighting device of such type is conventionally known (for example, Japanese Laid-open Patent Application No. 2004-34742). Hereinafter, a conventional driving circuit will be described. The conventional driving circuit is provided with: a plurality of light emitting elements (LEDs); a direct current power source for feeding a driving current to the plurality of light emitting elements; and a connector at which a plurality of connection terminals indicating a plurality of electrical resistance values are provided. In addition, the plurality of light emitting elements is adapted to receive a feed of direct current power through a connection terminal that is selected according to its own electrical characteristics.

However, the conventional driving circuit uses a package product such as an SMD as a light emitting element (an LED) and uses the light emitting element as a package product that is classified and ranked on the order of 4 or 5 ranks subsequent to measuring Vf characteristics of the light emitting element after packaged. In addition, the conventional driving circuit is manufactured by connecting a resistor in series to a package product so that a predetermine set current is obtained for each of the light emitting element groups as package products classified and ranked in detail at the time of board fabrication and then setting a resistance constant for each light emitting group of the thus classified and ranked package product. As a result, in the conventional driving circuit, in order to provide a downsized, inexpensive semiconductor-type light source, in a case where a bare-chip light emitting element is used instead of a package product such as an SMD as a light emitting element, it is ineffective and difficult to classify and rank the bare-chip light emitting element subsequent to measuring Vf characteristics of the light emitting element that is in such a bare-chip state.

The present invention has been made in order to solve the above-described problem that, in the conventional light source unit, it is ineffective and difficult to classify and rank the light emitting element subsequent to measuring Vf characteristics of the light emitting elements that are in a bare-chip state.

SUMMARY OF THE INVENTION

A first aspect of the present invention comprises a plurality of light emitting chips having a semiconductor-type light source packaged on a board, and is characterized in that: resistors are mounted on the board, for feeding a current (a driving current) of a predetermined value that is set for the plurality of light emitting chips; and at least an opening resistor and a trimming resistor are disposed in parallel as the resistors. In other words, the first aspect of the present invention is characterized in that: light emitting chips (LEDs) in a bare-chip state are randomly mounted on a board without classifying Vf characteristics in advance; and values of the resistors that are mounted on the board and connected in series to the light emitting elements are adjusted so that predetermined set current values or luminous flux values are reliably obtained with respect to the light emitting chips mounted on the board.

In addition, a second aspect of the present invention is directed to the driving circuit of semiconductor-type light source for vehicle lighting device, according to the first aspect of the present invention, wherein a power capacitance of the opening resistor is smaller than a power capacitance of the trimming resistor.

Further, a third aspect of the present invention is directed to the driving circuit of semiconductor-type light source for vehicle lighting device, according to the first aspect of the present invention, wherein: the opening resistor and trimming resistor are made of a thin film resistor or a thick film resistor; and an area of the opening resistor is smaller than an area of the trimming resistor.

Furthermore, a fourth aspect of the present invention is directed to a vehicle lighting device using a semiconductor-type light source as a light source, the vehicle lighting device comprising: a lamp housing and a lamp lens that are adapted to partition a lamp room; a light source unit using a semiconductor-type light source as a light source, the semiconductor-type light source being disposed in the lamp room and made of a plurality of light emitting chips; and a driving circuit of semiconductor-type light source for vehicle lighting device, according to the first aspect of the present invention, the driving circuit being a driving circuit of the semiconductor-type light source of the light source unit.

In the driving circuit of semiconductor-type light source for vehicle lighting device, according to the first aspect of the invention, a plurality of light emitting chips and resistors are mounted on a board and then values of the resistors are adjusted in order to feed a current of a predetermined value that is set for the plurality of light emitting chips. As a result, the driving circuit of the semiconductor-type light source of the vehicle lighting device, according to the first aspect of the invention, is capable of easily, inexpensively, and microscopically mounting the plurality of light emitting chips and resistors on the board.

Here, in a process of light emitting chips (in particular, bare chips) of semiconductor-type light sources, light emitting chips with different Vf characteristics in a predetermined dispersion value are manufactured on a wafer. Therefore, as in the driving circuit of semiconductor-type light source for vehicle lighting device, according to the first aspect of the invention, in a case where a plurality of light emitting chips are used after mounted on a board, it is inefficient, difficult, and high in cost to individually measure Vf characteristics of the light emitting chips on the wafer on a one-by-one chip basis and group the chips by Vf characteristics in a predetermined margin and then mount a plurality of the thus grouped light emitting chips on the board.

Thus, in order to randomly mount on the board a plurality of light emitting chips with different Vf characteristics in a predetermined dispersion margin and then achieve a set current value or luminous flux value under a rated input condition, a value of a resistor that is connected in series to a plurality of light emitting chips needs to be adjusted to a value that is suitable for combined Vf characteristics of the plurality of light emitting chips.

Here, in a case where a resistor, a conductor, and a light emitting chip mounting pad or the like are formed in series in a thick film or thin film process requiring downsizing and low cost, it is difficult and unreasonable to form a resistance value that is suitable for combined Vf characteristics of the plurality of light emitting chips subsequent to mounting the plurality of light emitting chips on the board.

Therefore, the driving circuit of semiconductor-type light sources for the vehicle lighting devices, according to the first aspect of the invention, is reasonable in that: a plurality of light emitting chips are mounted on a board on which a resistor, a conductor, and a light emitting chip mounting pad or the like are formed in series in a thick film or a thin film process; and then, values of the resistors that are connected in series to a plurality of light emitting chips are adjusted to a value that is suitable for combined Vf characteristics of the plurality of light emitting chips.

In particular, in a plurality of light emitting chips are connected in series, dispersion of Vf characteristics of the individual light emitting chips is added (amplified), so that an adjustment margin of values of resistors provided to feed a predetermined current set for the plurality of light emitting chips (mounted in series) also increases to about 200% to 300%. Thus, it is difficult to allocate a required adjustment margin in a technique for trimming the resistors that are merely connected in series to the plurality of light emitting chips. Therefore, the driving circuit of the semiconductor-type light source of the vehicle lighting device, according to the first aspect of the invention, is characterized in that a trimming resistor (a resistor targeted for trimming) and an opening resistor (a resistor targeted for opening) are connected in parallel as resistors in order to broaden a required adjustment margin, thereby achieving the broaden required adjustment margin.

Moreover, in the driving circuit of semiconductor-type light source for vehicle lighting device, according to the first aspect of the invention, as resistors, an opening resistor and a trimming resistor are disposed in parallel. Thus, at the time of adjusting values of the resistors, an appropriate current (the current of a value to an extent such that a stress is not applied to a plurality of light emitting elements) is supplied to a plurality of light emitting elements to read combined Vf characteristics of the plurality of light emitting elements; it is first judged whether or not the opening resistor is opened, and based upon the judgment, the opening resistor is opened or is kept unchanged as it is; and subsequently, it is judged whether or not the trimming resistor is trimmed, and based upon the judgment, the value of the trimming resistor is adjusted or is kept unchanged as it is. Therefore, the driving circuit of the semiconductor-type light source of the vehicle lighting device, according to the first aspect of the invention is efficient, reasonable, and low in cost.

The driving circuit of semiconductor-type light source for vehicle lighting device, according to the second aspect of the invention, allows a power capacitance of the opening resistor to be smaller than a power capacitance of the trimming resistor. In other words, the driving circuit of semiconductor-type light source for vehicle lighting device, of the second aspect of the invention, allows an opening resistor and a trimming resistor to be connected in parallel, so that a current is branched into the opening resistor and the trimming resistor. Thus, in a case where resistors of which resistance values are on the order of the same degree are connected in parallel, a power loss of the resistors is R×I×I, so that the power capacitance (resistance capacitance) of the opening resistor (resistor targeted for opening) can be merely ¼ of the power capacitance (resistance capacitance) of the trimming resistor (resistor targeted for trimming). The value of the trimming resistor after trimmed increases, so that a current that flows in the opening resistor increases accordingly and then slightly increases more than the power capacitance (resistance capacitance) of ¼. Therefore, the driving circuit of semiconductor-type light source for vehicle lighting device, according to the second aspect of the invention, can be inexpensively manufactured because the power capacitance (resistance capacitance) of the opening resistor is allowed to be smaller than the power capacitance (resistance capacitance) of the trimming resistor.

Further, the driving circuit of semiconductor-type light source for vehicle lighting device, according to the third aspect of the invention, is capable of efficiently opening an opening resistor while efficiently adjusting a resistance value of a trimming resistor, because an area of the opening resistor is smaller than an area of the trimming resistor in a case where the opening resistor and the trimming resistor is made of a thin film resistor or a thick film resistor.

Furthermore, the driving circuit of semiconductor-type light source for vehicle lighting device, according to the fourth aspect of the invention, is capable of achieving an advantageous effect similar to that of the driving circuit of semiconductor-type light source for vehicle lighting device, according to the first aspect of the invention, by a means for solving the above-described problem.

BRIEF DESCRIPTION OF THE DRAWINGS

FIG. 4 is an explanatory view showing a state in which the values of the resistors are adjusted to a value that is suitable for combined Vf characteristics of the plurality of light emitting chips similarly;

DESCRIPTION OF THE PREFERRED EMBODIMENTS

Hereinafter, with reference to the accompanying drawings, a detailed description will be given with respect to: an exemplary embodiment of a driving circuit of semiconductor-type light source for vehicle lighting device, according to the present invention; and an exemplary embodiment of a vehicle lighting device according to the present invention. It should be noted that the present invention is limited by the exemplary embodiments.

[Exemplary Embodiments]

Figure 7:
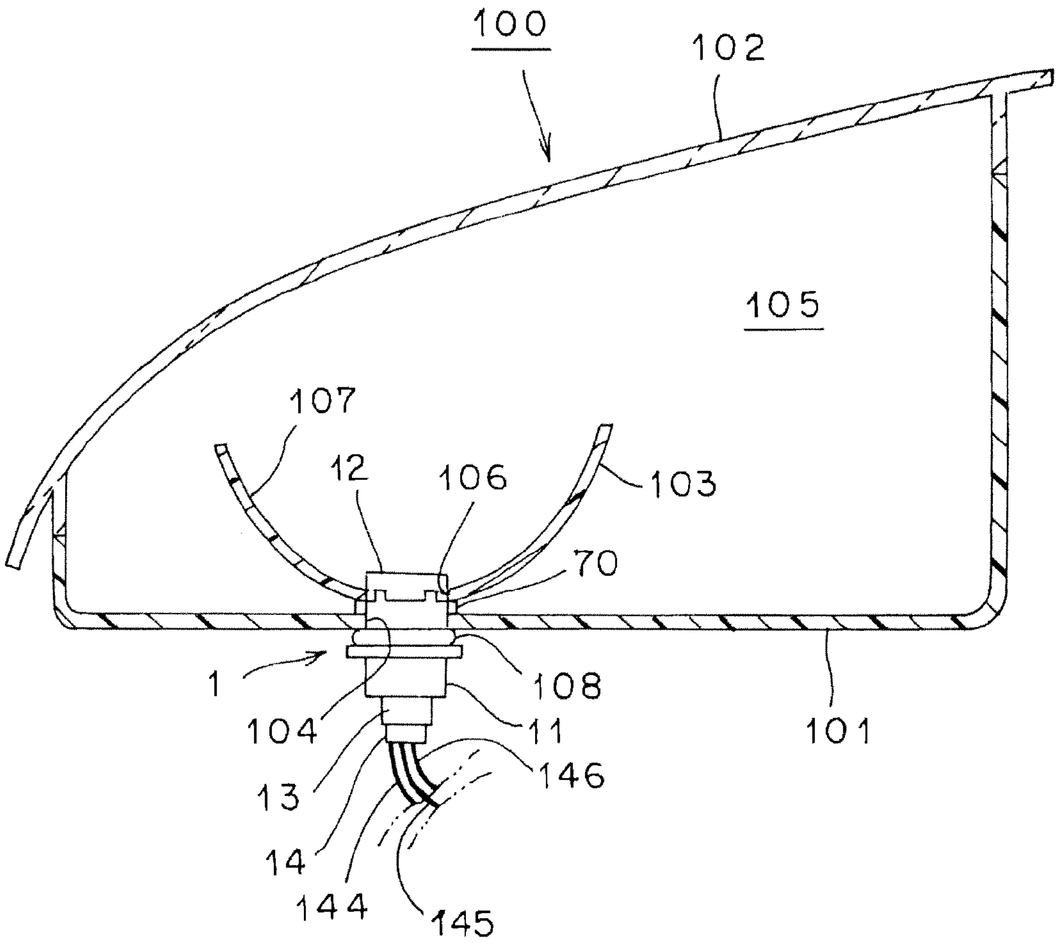
FIG. 7 is a longitudinal cross-sectional view (vertical cross-sectional view) showing an embodiment of a vehicle lighting device according to the present invention.

Hereinafter, a description will be given with respect to a driving circuit of semiconductor-type light source for vehicle lighting device, in the exemplary embodiment, and a configuration of a vehicle lighting device in the exemplary embodiment. In FIG. 7, reference numeral 100 designates a vehicle lighting device in the exemplary embodiment.

[Vehicle Lighting Device 100]

The vehicle lighting device 100 is a tale stop lamp of single light type in the exemplary embodiment. In other words, the vehicle lighting device 100 uses a tale lamp function (see FIG. 8) and a stop lamp function (see FIG. 9) with a single lamp together. The vehicle lighting device 100 is equipped at each of the rear left and right of a vehicle (not shown). The vehicle lighting device 100 may be combined with another lamp function (for example, a backup lamp function), although not shown, thereby configuring a rear combination lamp.

Figure 1:
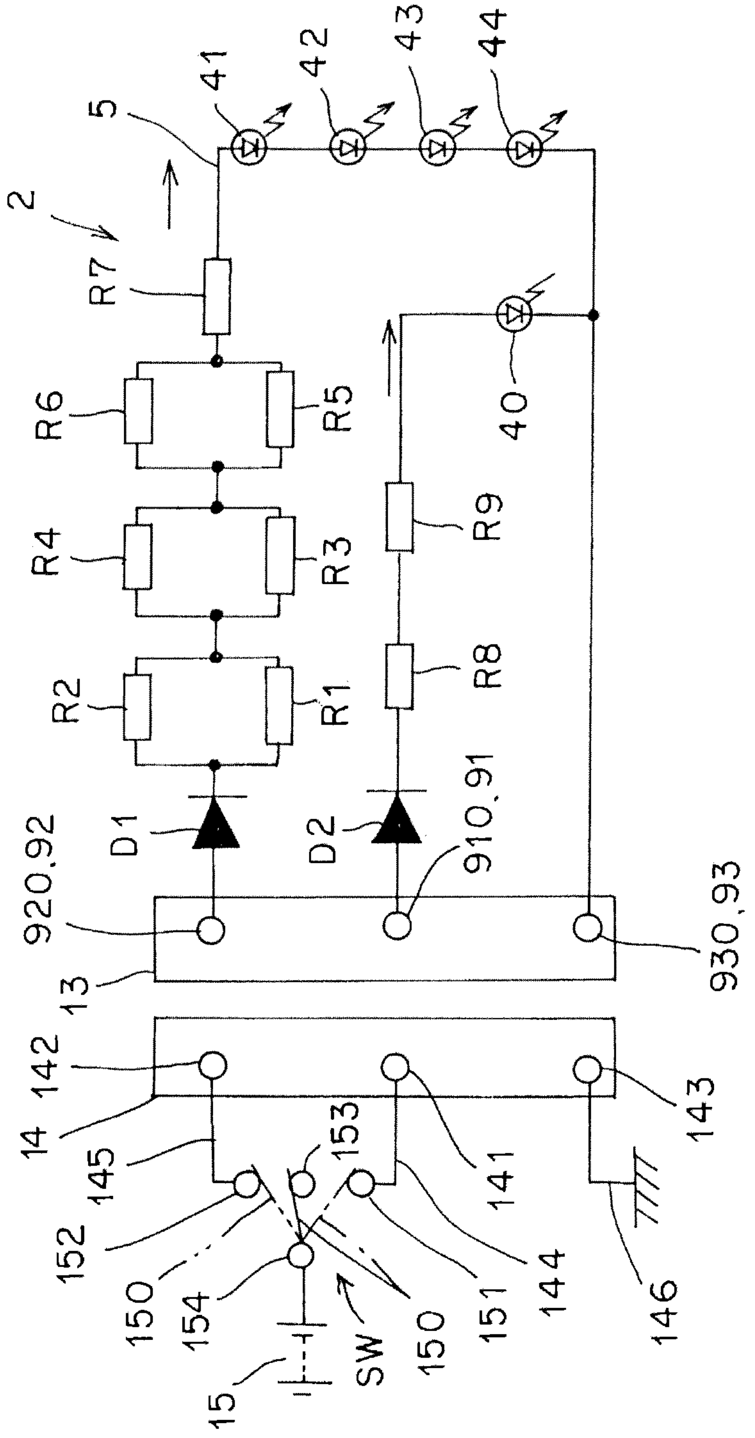
FIG. 1 is an electrical circuit diagram showing an embodiment of a driving circuit of semiconductor-type light source for vehicle lighting device, according to the present invention.

The vehicle lighting device 100, as shown in FIG. 7, is provided with: a lamp housing 101, a lamp lens 102, and a reflector 101: a light source unit 1 using a semiconductor-type light source as a light source; and a driving circuit 2 of the semiconductor-type light source for the light source unit 1 (see FIG. 1).

The lamp housing 101 is made up of an optically opaque member (for example, a resin member). The lamp housing 101 is formed in a hollow shape in which one side opens and the other side is closed. A through hole 104 is provided at the closed portion of the lamp housing 101.

The lamp lens 102 is made up of an optically opaque member, for example (a transparent resin member or a glass member, for example). The lamp lens 102 is formed in a hollow shape in which one side opens and the other side is closed. A peripheral edge part of the opening of the lamp lens 102 and a peripheral end part of the opening of the lamp housing 101 are fixed to each other with water tightness. A lamp room 105 is partitioned by the lamp housing 101 and the lamp lens 102.

The reflector 103 is a light distribution control portion for optically distributing and controlling light radiated from the light source unit 1, and has a focal point P. The reflector 103 is disposed in the lamp room 105 and is fixed to the lamp housing 101 or the like. The reflector 103 is made up of an optically opaque member (for example, a resin member or a metal member). The reflector 103 is formed in a hollow shape in which one side opens and the other side is closed. At the closed portion of the reflector 103, a through hole 106 is provided so as to communicate with the through hole 104 of the lamp housing 101. A reflection face 107 is provided on an interior face of the reflector 103. While the reflector 103 is made of a member other than the lamp housing 101, this reflector may be integrated with the lamp housing. In this case, a reflection face is provided at a part of the lamp housing to thereby provide a reflector function.

[Light Source Unit 1]

Figure 5:
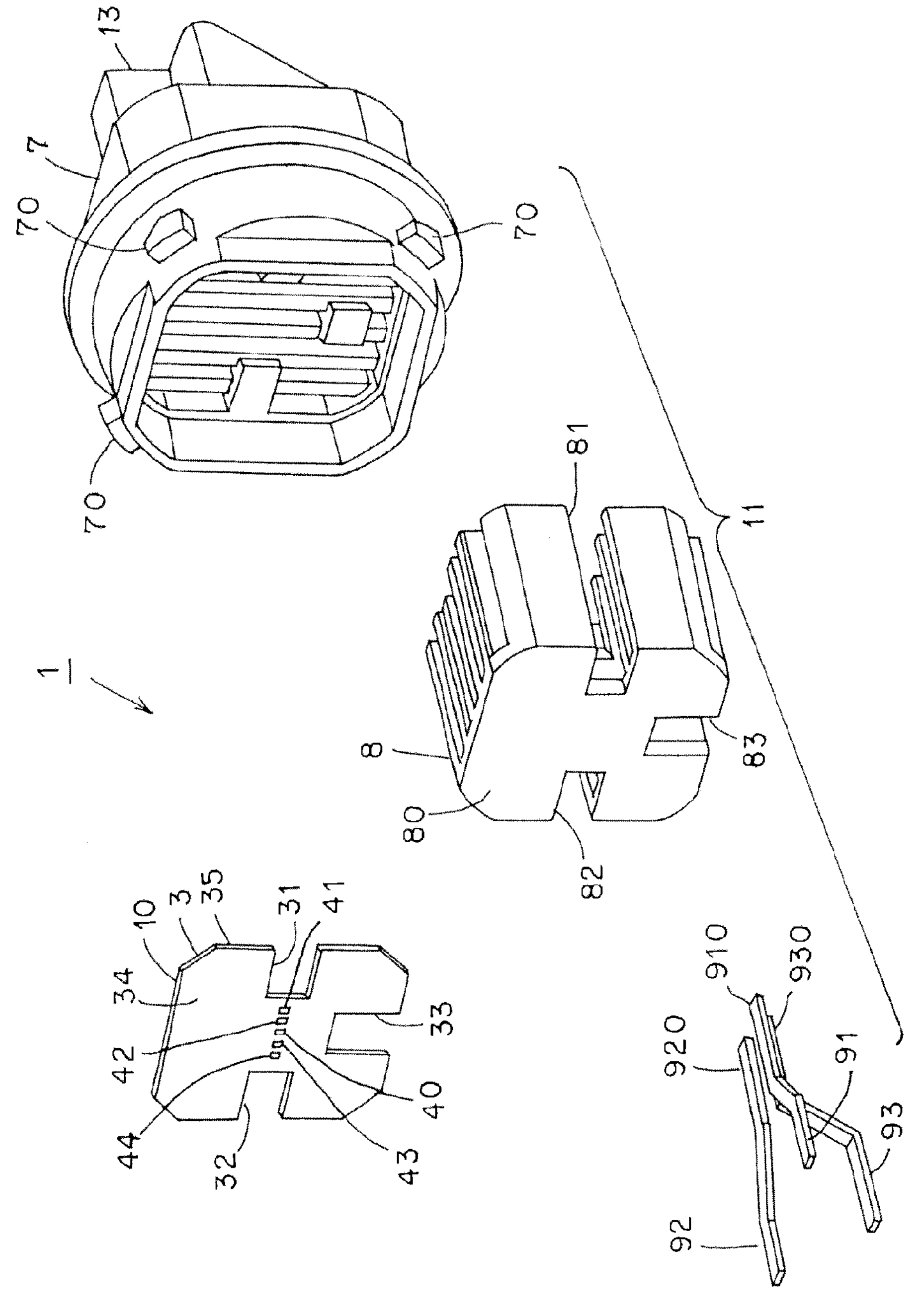
FIG. 5 is an exploded perspective view showing a light source portion and a socket portion similarly.
Figure 6:
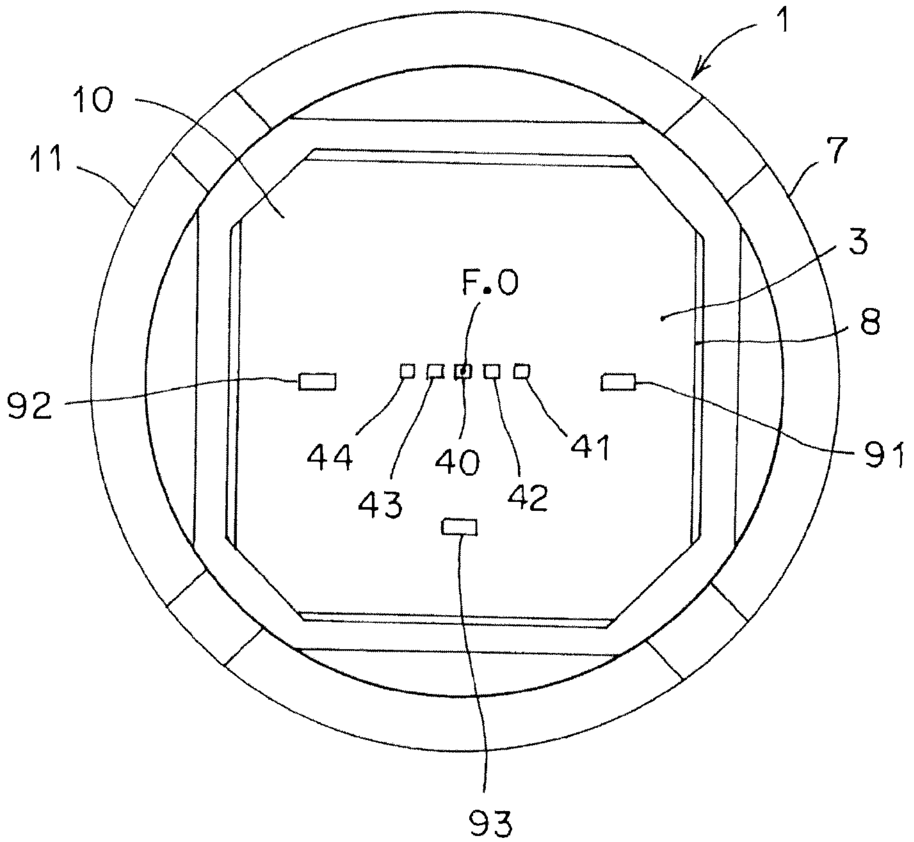
FIG. 6 is a plan view showing a state of assembling the light source portion and the socket portion similarly.

The light source unit 1, as shown in FIG. 5 to FIG. 7, is provided with a light source portion 10, a socket portion 11, and a cover portion 12. The light source portion 10 and the cover portion 12 are mounted on one end part (an upper end part) of the socket portion 11. The light source portion 10 is covered with the cover portion 12.

The light source unit 1, as shown in FIG. 7, is equipped in the vehicle lighting device 100. The socket portion 11 is mounted with water tightness and removably via a water resistance packing (O-ring) 108 in the lamp housing 101. The light source portion 10 and the cover portion 12 are disposed in the lamp room 105 through the through hole 104 of the lamp housing 101 and the through hole 106 of the reflector 103 and on the reflection face 107 side of the reflector 103.

[Light Source Portion 10]

Figure 2:
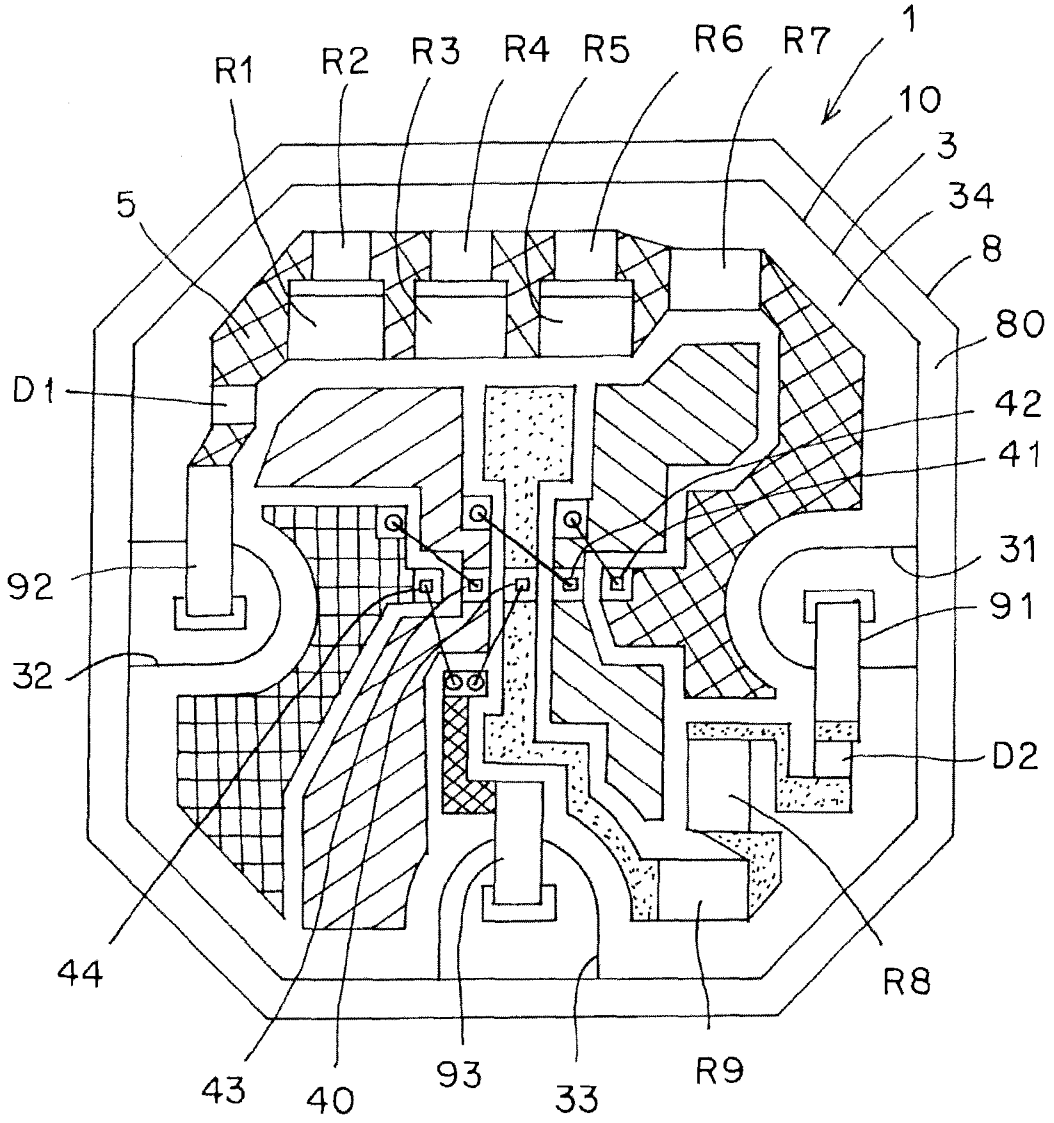
FIG. 2 is a plan view (a top view) showing a state in which light emitting chips and resistors are disposed similarly.

The light source portion 10, as shown in FIG. 2, FIG. 5, and FIG. 6, is provided with: a board 3 serving as a mount member; a plurality of, in this embodiment, five light emitting chips 40, 41, 42, 43, 44 of the semiconductor-type light source; nine resistors R1, R2, R3, R4, R5, R6, R7, R8, R9 and two diodes D1, D2 serving as control elements; and a conductor 5, wirings and a bonding portion serving as wiring elements.

The board 3 is made of ceramics, in the exemplary embodiment. The board 3, as shown in FIG. 2, FIG. 5, and FIG. 6, is formed in a substantially octet-plate shape as seen from a plane (top). Cutouts 31, 32, 33 are provided, respectively, at substantial centers of three edges (a right edge, a left edge, and a bottom edge) of the board. A flat mount face 34 is provided on one face (a top face) of the board 3. A flat abutment face 35 is provided on the other face (a bottom face) of the board 3. A high reflection face (not shown) such as high reflection coating or high reflection vapor deposition is provided on the mount face 34 of the board 3.

The five light emitting chips 40 to 44; the nine resistors R1 to R9; the two diodes D1, D2; and the conductor, the wirings, and the bonding portion that serve as wiring elements are mounted on the mount face 34 of the board 3 (in other words, these elements are provided by means of packaging, printing, vapor deposition, plating, etching or the like). In FIG. 5 and FIG. 6, for the sake of clarity, there may be a case in which the nine resistors R1 to R9, the two diodes D1, D2, and the conductor 5, the wirings, the bonding portion, and the cutouts 31 to 33 or the like are not be shown.

The semiconductor-type light source made of the five light emitting chips 40 to 44 uses a self-emitting, semiconductor-type light source (an LED in the exemplary embodiment) such as an LED or an EL (an organic EL). The light emitting chips 40 to 44, as shown in FIG. 1, FIG. 2, FIG. 5, and FIG. 6, are made of semiconductor chips (light source chips) formed in a very small rectangle (a square or an rectangular shape) as seen from a plane (top), and is made of bear chips in the exemplary embodiment. The five light emitting chips 40 to 44, as shown in FIG. 6, are disposed at a focal point F of the reflector 103 of an optical system and in one line in proximity to a center (a mounting rotation center) O of the socket portion 11 of the light source unit 1 or so as to be substantially similar to light emission due to filament of a light source bulb or arc discharge of a discharge electric bulb (a HID lamp).

The five light emitting chips 40 to 44 are divided (grouped) into: one light emitting chip 40 that is a light emitting chip to which a low current is to be supplied and that is a light source of a tale lamp; four light emitting chips 41 to 44 that are light emitting chips to which a high current is to be supplied and that are light sources of a stop lamp. One light emitting chip 40 of the tale lamp function (a light source of a tale lamp) is disposed between two light emitting chips 41, 42 of the stop lamp function (light sources of the stop lamp) at the right side; and two light emitting chips 43, 44 of the stop lamp function (light sources of the stop lamp) at the left side. The four light emitting chips 41 to 44 of the stop lamp function are connected in series in a forward direction.

[Resistors R1 to R9]

The resistors R1 to R9 are made of thin film resistors or thick film resistors, for example. The resistors R1 to R9 are adjustment resistors for obtaining a predetermined driving current. In other words, due to dispersion of Vf characteristics (forward voltage characteristics) of the light emitting chips 40 to 44, a value of the driving current that is supplied to the light emitting chips 40 to 44 varies and then dispersion occurs in brightness (luminous flux, luminous intensity, intensity of illumination) of the light emitting chips 40 to 44. Thus, the values of the resistors R1 to R9 are adjusted (trimmed) and then the value of the driving current that is supplied to the light emitting chips 40 to 44 are substantially uniformly set at a predetermined value, whereby dispersion of the brightness (luminous flux, luminous intensity, intensity of illumination) of the light emitting chips 40 to 44 can be adjusted (absorbed). The trimming is adapted to adjust a resistance value with the use of laser beams by cutting out a part of the resistors R1 to R9 by means of laser beams (see trimming grooves (trimmings) 50 that are indicated by the single-dotted chain line, the solid line, and the dashed line of FIG. 3(B)) or by cutting out all of the resistors (see cutout (opening) 51 that is indicated by the solid line of FIG. 3(C) or FIG. 3(D)). A resistance value increases due to such opening and trimming.

The resistors that are connected in series to the four light emitting chips 41 to 44 of the stop lamp function are made of opening resistors R2, R4, R6 and trimming resistors R1, R3, R5, R7. The opening resistor R2, R4, R6 and the trimming resistors R1, R3, R5 are disposed in parallel after divided into three groups and are disposed in series in each group. The trimming resistor R7 is disposed in series for the resistors R1 to R6.

The power capacitance of the opening resistors R2, R4, R6 is smaller than that of the trimming resistor R1, R3, R5, R7. An area of the opening resistors R2, R4, R6 is smaller than that of the trimming resistors R1, R3, R5, R7.

The resistors R8, R9 that are connected in series to one light emitting chip 40 of the tale lamp function are trimming resistors. These trimming resistors are disposed in series.

While there are disposed: the two resistors R8, R9 that are connected series to one light emitting chip 40 of the tale lamp function; and the seven resistors R1 to R7 that are connected to series to four light emitting chips 41 to 44 of the stop lamp function, in FIG. 1 and FIG. 2, respectively, the number of these chips may be varied depending upon the capacitance of a resistor and a variable margin of an adjustment resistor. In other words, the number of the resistors is not limited thereto.

The diodes D1, D2 are made of a bear-chip diode or an SMD diode, for example. The diode D2 that is connected in series to one light emitting chip 40 of the tale lamp function and the resistors R8, R9; and the diode D1 that is connected in series to four light emitting chips of the stop lamp function and the resistors R1 to R7, are diodes of a pulse noise protection function from a reversed-contact preventing function and a backward direction.

The conductor 5 is made of a thin film wire or a thick film wire of an electrically conductive member, for example. The conductor 5, the wirings, and the bonding portion that serve as wiring elements are adapted to feed power to the light emitting chips 40 to 44 via the resistors R1 to R9 and the diodes D1, D2 that serve as control elements.

The fine light emitting chips 40 to 44; the nine resistors R1 to R9; the two diodes D1, D2; and the conductor 5, the wirings, and the bonding portion are disposed and connected to each other, as shown in the electrical circuit diagram of FIG. 1 and in the layout of electric parts of FIG. 2.

The light source portion 10, as described previously, is provided with: the board 3 serving as a mount member; the light emitting chips 40 to 44 of semiconductor-type light source; the resistors R1 to R9 and the diodes D1, D2 that serve as control elements; and the conductor 5, the wirings, and the bonding portion that serve as wiring elements.

The five light emitting chip 40 to 44; the nine resistors R1 to R9; the two diodes D1, D2; and the conductor 5, the wires, and the bonding portion are divided (grouped) by the tale lamp function and the stop lamp function. In other words, the five light emitting chips are divided into: one light emitting chip 40 of the tale lamp function to which a low current is to be supplied, a heat rate of which is small; and four light emitting chips 41 to 44 of the stop lamp function to which a high current is to be supplied, a heat rate of which is large.

Among the five light emitting chips 40 to 44, one light emitting chip 40 of the tale lamp function, as shown in FIG. 6, is disposed at a center O of the board 3 and at or near a center O of a heat radiation member 8 to be described later.

[Socket Portion 11]

The socket portion 11, as shown in FIG. 5 and FIG. 6, is provided with an insulation member 7, a heat radiation member 8, and three power feeding members 91, 92, 93. The heat radiation member 8 having its appropriate heat transmissibility and heat conductivity; and the power feeding member 8 and the power feeding members 91 to 93 having its appropriate electrical conductivity are integrally incorporated into the insulation member 7 having its appropriate insulation property in an mutually insulated state.

[Insulation Member 7]

The insulation member 7 is made of an insulation resin member, for example. The insulation member 7 is formed in a substantially cylindrical shape. A mount portion 70 is provided at one end part (an upper end part) of the insulation member 7. The mount portion 70 is adapted to equip the light source unit 1 in the vehicle lighting device 100. In other words, the mount portion 70 is adapted to insert a part of the cover 12 side of the socket portion 11 into the through hole 104 of the lamp housing 101 and then, in that state, rotate the socket portion 11 axially around the center O of the lamp housing 101, whereby the socket portion 11 is mounted with water tightness and removably to the lamp housing 10 via the water resistance packing 108.

A connector portion 13 at the light source side is integrally provided at the other end part (a lower end part) of the insulation member 7. A connector 14 at the power supply side is mechanically, removably, and electrically mounted intermittently to the connector portion 13.

[Heat Radiation Member 8]

The heat radiation member 8 is made of an aluminum-based die-cast or a resin member having heat conductivity (having electrical conductivity as well). The heat radiation member 8 is formed in a flat-plate shape at one end part (an upper end part) and is formed in a fin-like shape from a middle part to the other end part (a lower end part). An abutment face 80 is provided on a top face of one end part of the heat radiation member 8. The abutment face 80 of the heat radiation member 8 and the abutment face 35 of the board 3 are bonded with each other by means of a thermally conductive additive (not shown) in a state in which these abutment faces are abutted with each other. As a result, the light emitting chips 40 to 44 each are positioned in correspondence to a site at which a portion 86 proximal to the center O of the heat radiation member 8 is positioned via the board 3.

At substantial centers of three edges (a right edge, a left edge, a bottom edge) of the heat radiation member 8, the cutouts 81, 82, 83 are provided in correspondence to the cutouts 31 to 33 of the board 3, respectively. The three power feeding members 91 to 93 are disposed in respective ones of the cutouts 81 to 83 of the heat radiation member 8 and the cutouts 31 to 33 of the board 3. The insulation member 7 is interposed between the heat radiation member 8 and the power feeding members 91 to 93. The heat radiation member 8 comes into intimate contact with the insulation member 7.

The power feeding members 91 to 93 come into intimate contact with the insulation member 7.

[Power Feeding Members 91 to 93]

The power feeding members 91 to 93 are made of an electrically conductive metal member, for example. One end parts (upper end parts) of the power feeding members 91 to 93 are formed in a fan shape. These end parts are positioned at respective ones of the cutouts 81 to 83 of the heat radiation member 8 and the cutouts 31 to 33 of the board 3. One end parts of the power feeding members 91, 92, 93 each are electrically connected to the conductor 5 of the light source portion 10. In this manner, the light source portion 10 is mounted on one end part (one end opening) of the socket portion 11 formed in a cylindrical shape. At one end part of each of the power feeding members 91 to 93, the board 3 may be mechanically fixed to the heat radiation member 8.

The other end parts (lower end parts) of the power feeding members 91 to 93 are formed in a narrowed shape, and are disposed in the connector portion 13. The other end parts of the power feeding members 91 to 93 configure male terminals (male-type terminals) 910, 920, 930.

[Connector Portion 13 and Connector 14]

Figure 8:
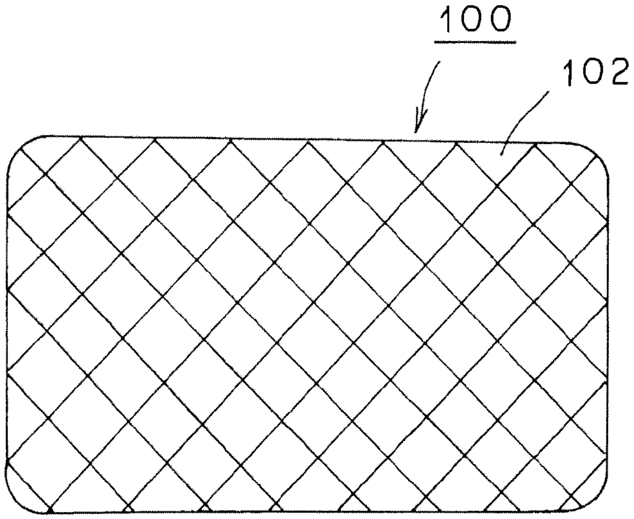
FIG. 8 is an explanatory view showing a state in which a tail lamp function lights up similarly.
Figure 9:
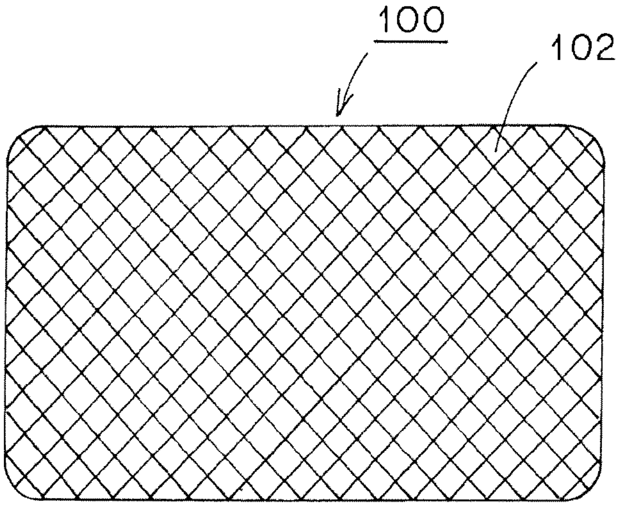
FIG. 9 is an explanatory view showing a state in which a stop lamp function lights up similarly.

As shown in FIG. 8, at the connector 14, female terminals (female-type terminals) 141, 142, 143 to be electrically connected to or disconnected from the male terminals 910 to 930 of the connector portion 13 are provided. By mounting the connector 14 to the connector portion 13, the female terminals 141 to 143 are electrically connected to the male terminals 910 to 930. In addition, by removing the connector 14 from the connector 13, electrical connection between the female terminals 141 to 143 and the male terminal 910 to 930 is cut off.

As shown in FIG. 1, the first female terminal 141 and the second female terminal 142, of the connector 14, are connected to a power source (direct current battery) 15 via harnesses 144, 145 and a switch SW. The third female terminal 143 of the connector 14 is earthed (grounded) via a harness 146. The connector portion 13 and the connector 14 are a connector portion and a connector of three-pin type (the three power feeding members 91 to 93, the three male terminals 910 to 930, or the three female terminals 141 to 143).

[Switch SW]

The switch SW is a three-position change switch made of a movable contact point 150, a first fixed contact point 151, a second fixed contact point 152, a third fixed contact point 153, and a common fixed contact point 154.

When the movable contact point 150 is changed to a position of the first fixed contact point 151 (when the state indicated by the single-dotted chain line in FIG. 1 is established), a current (a driving current) is supplied to one light emitting chip 40 of the tale lamp function via the diode D2 and the resistors R8, R9, of the tale lamp function. In other words, to one light emitting chip 40 of the tale lamp function, a driving current is supplied through the diode D2 and the resistors R8, R9, of the tale lamp function.

When the movable contact point 150 is changed to a position of the second fixed contact point 152 (when the state indicated by the double-dotted chain line in FIG. 1 is established), a current (a driving current) is supplied four light emitting chips 41 to 44 of the stop lamp function through the diode D1 and the resistors R1 to R7 of the stop lamp function. In other words, to the four light emitting chips 41 to 44 of the stop lamp function, a driving current is supplied through the diode D1 and the resistors R1 to R7, of the stop lamp function.

When the movable contact point 150 is changed to a position of the first fixed contact point 153 (when the state indicated by the solid line in FIG. 1 is established), a current feed to the five light emitting chips 40 to 44 is cut off.

[Cover Portion 12]

The cover portion 12 is made of an optically transparent member. At the cover portion 12, an optical control portion (not shown) such as a prism is provided for optically controlling and emitting light beams from the five light emitting chips 40 to 44. The cover portion 12, as shown in FIG. 7, is mounted to one end part (one end opening) of the socket portion 11 formed in a cylindrical shape so as to cover the light source portion 10 therewith. The cover portion 12 is adapted to prevent the five light emitting chips 40 to 44 from an external influence, for example, contact of a foreign object or adhering of dust. In other words, the cover portion 12 is adapted to protect the five light emitting chips 40 to 44 from disturbance.

The driving circuit 2 of semiconductor-type light source for vehicle lighting device, in the exemplary embodiment; and the vehicle lighting device 100 in the exemplary embodiment (hereinafter, referred to the light source unit 1 and the vehicle lighting device 100 in the exemplary embodiment), are made of the constituent elements as described above. Hereinafter, a description will be given with respect to adjustment of a resistance value that is suitable for combined Vf characteristics of four light emitting chips 41 to 44 of the stop lamp function.

First of all, on a board 3, resistors R1 to R9, a conductor 5, and a light emitting pad mounting pad or the like are formed in series in accordance with a thick film or thin film process. On the board 3, four light emitting chips 41 to 44 with different Vf characteristics in a predetermined dispersion margin are randomly selected and mounted.

The light emitting chips are classified into five Vf ranks. For example, they are classified into: a Vf rank of 1.90 V to 2.05 V; a Vf rank of 2.05 V to 2.20 V; a Vf rank of 2.20 V to 2.35 V; a Vf rank of 2.35 V to 2.50 V; and a Vf rank of 2.50 V to 2.65 V. Thus, if four light emitting chips 41 to 44 are randomly selected, combined Vf characteristics of the four light emitting chips 41 to 44 are within the range of 7.60V to 10.60V.

The combined Vf characteristics of the four light emitting chips, as shown in FIG. 4, are divided into five ranges A, B, C, D, E. For example, they are divided into: a Vf rank A of 7.60 V to 8.20 V; a Vf rank B of 8.20 V to 8.80 V; a Vf rank C of 8.80 V to 9.40 V; a Vf rank of D of 9.40 V to 10.00 V; and a Vf rank E of 10.00 V to 10.60 V.

Figure 3:
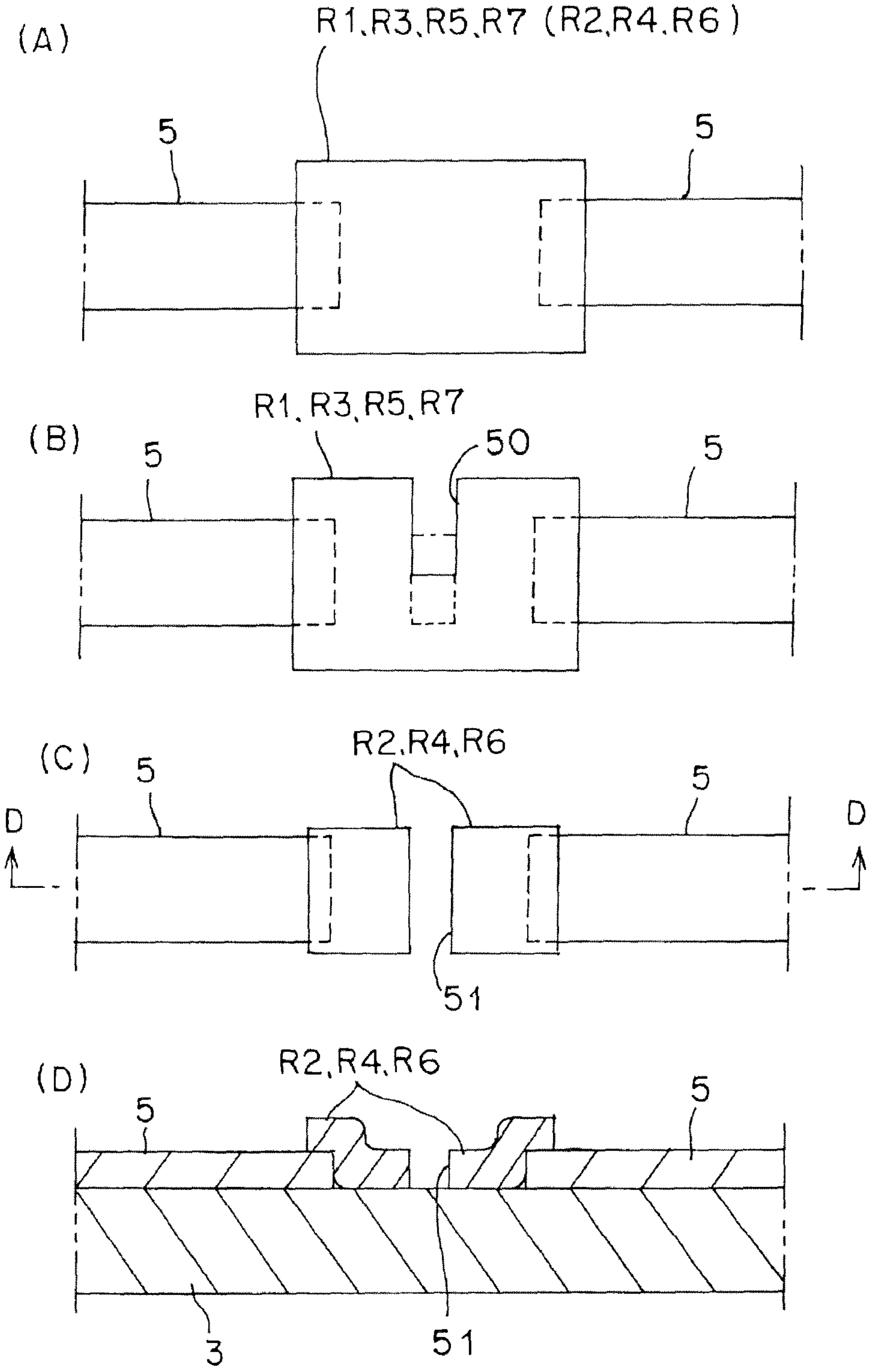
FIG. 3 is an explanatory view showing a state in which values of the resistors are adjusted similarly.

Next, an external resistor (not shown. this resistor is the one other than the resistors R1 to R7) is connected in series to the four light emitting chips 41 to 44; a current of the order of 10 mA is supplied; and combined Vf characteristics of the four light emitting chips 41 to 44 are read. The thus read combined Vf characteristics of the four light emitting chips are correlated with the five ranks A, B, C, D, E of the combined Vf characteristics shown in FIG. 4. In accordance with the ranks A, B, C, D, E of the combined Vf characteristics shown in FIG. 4, as shown in FIG. 3 (C) and FIG. 3 (D), opening resistors R2, R4, R6 are opened with trimming laser beams as required. For example, in a case where the read combined Vf characteristics correspond to the rank A, the opening resistors R2, R4, R6 are opened. In a case where the read combined Vf characteristics correspond to the rank B, the opening resistors R2, R4 are opened. In a case where the read combined Vf characteristics correspond to the rank C, the opening resistor R6 is opened. In a case where the read combined Vf characteristics correspond to the rank D, the opening resistor R6 is opened. In a case where the read combined Vf characteristics correspond to the rank E, the opening resistors R2, R4, R6 are not opened.

Next, in order to obtain a set current (a set amount of light, a set luminous flux, a set luminous intensity), as shown in FIG. 3 (B), trimming resistors R1, R3, R5, R7 are sequentially trimmed for a maximum of 130% (or a maximum of 150%). For example, in a case where the read combined Vf characteristics correspond to the rank A, the trimming resistors R3, R5, R7 are trimmed. In a case where the read combined Vf characteristics correspond to the rank B, the trimming resistors R3, R5, R7 are trimmed. In a case where the read combined Vf characteristics correspond to the rank C, the trimming resistors R3, R5, R7 are trimmed. In a case where the read combined Vf characteristics correspond to the rank D, the trimming resistor R7 is trimmed. In the case where the read combined Vf characteristics correspond to the rank E, the trimming resistor R7 is trimmed.

In this way, in the opening resistors R2, R4, R6 and the trimming resistors R1, R3, R5, R7, a resistance value that is suitable for the combined Vf characteristics of the four light emitting chips 41 to 44 of a stop lamp function are adjusted. Substantially similarly, in the resistors R8, R9, a resistance value that is suitable for Vf characteristic of one light emitting chip 40 of a tale lamp function is adjusted.

A driving circuit 2 of semiconductor-type light source of vehicle lighting device in the exemplary embodiment; and a vehicle lighting device 100 in the exemplary embodiment (hereinafter, referred to as a light source unit 1 and a lighting device 100), are made of the above-described constituent elements. Hereinafter, a functional description will be given.

First, a movable contact point 150 of a switch SW is changed to a first fixed contact point 151. Then, a current (a driving current) is supplied to one light emitting chip 40 of a tale lamp function through a diode D2 and resistors R8, R9 of the tale lamp function. As a result, one light emitting chip 40 of the tale lamp function emits light.

The light radiated from one light emitting chip 40 of the tale lamp function transmits a cover portion 12 of the light source unit 1 and then is controlled to be optically distributed. A part of the light that is radiated from the light emitting chip 40 is reflected to the cover portion 12 side by means of a high reflection face of the board 3. The light that is controlled to be optically distributed transmits a lamp lens 102 of the vehicle lighting device 100; the transmitted light is controlled to be optically distributed again; and the thus controlled light is emitted to the outside. In this manner, the vehicle lighting device 100 emits the distributed light of the tale lamp function to the outside, shown in FIG. 8.

Next, the movable contact point 150 of the switch SW is changed to a second fixed contact point 152. A current (a driving current) is then supplied to four light emitting chips 41 to 44 of a stop lamp function through a diode D1 and resistors R1 to R7 of the stop lamp function. As a result, the four light emitting chips 41 to 44 emit light beams of the stop lamp function.

The light beams that are radiated from the four light emitting chips 41 to 44 of the stop lamp function transmit the cover portion 12 of the light source unit 1 and are controlled to be optically distributed. A part of the light beams that are radiated from the light emitting chips 41 to 44 is reflected to the cover portion 12 side, by means of a high reflection face of the board 3. The light beams that are controlled to be optically distributed transmit the lamp lens 102 of the vehicle lighting device 100; the transmitted light beams are controlled to be optically distributed again; and the thus controlled light beams are emitted to the outside. In this manner, the vehicle lighting device 100 emits the distributed light of the stop lamp function to the outside, shown in FIG. 9. The distributed light of the stop lamp function is bright (high in luminous flux, luminous intensity, and intensity of illumination) in comparison with that of the tale lamp function.

The movable contact point 150 of the switch SW is then changed to a third fixed contact point 153. A current (a driving current) is then interrupted. As a result, one light emitting chip 40 or four light emitting chips 41 to 44 light(s) out. In this manner, the vehicle lighting device 100 goes out.

Afterward, the heats that are generated in the light emitting chips 40 to 44 of the light source 10, resistors R1 to R9, diodes D1, D2, and conductors 51 to 56 are transmitted to a heat radiation member 8 via the board 3 and then the thus transmitted heats are radiated from the heat radiation member 8 to the outside.

A driving circuit 2 and a vehicle lighting device 100, in the exemplary embodiment, are made of the above-described constituent elements and functions. Hereinafter, an advantageous effect thereof will be described.

The driving circuit 2 and the vehicle lighting device 100, in the exemplary embodiment, mounts four light emitting chips 41 to 44 and resistors R1 to R7 on a board 3 and adjusts values of the resistors R1 to R7 in order to feed a current of a predetermined value that is set for the four light emitting chips 41 to 44. As a result, the driving circuit 2 and the vehicle lighting device 100, in the exemplary embodiment, can mount the four light emitting chips 41 to 44 and the resistors R1 to R7 on the board 3 easily, inexpensively, and microscopically.

Here, in a manufacturing process of light emitting chips (in particular, bare chips) of semiconductor-type light sources, light emitting chips with different Vf characteristics in a predetermined margin are manufactured on a wafer. As in the driving circuit 2 and the vehicle lighting device 100, in the exemplary embodiment, in a case where four light emitting chips 41 to 44 are used after mounted on the board 3, it is inefficient, difficult, and high in cost to individually measure Vf characteristics of light emitting chips on a wafer on a one-by-one chip bas it is and group them by Vf characteristics of a predetermined margin and then mount the grouped light emitting chips in plurality on the board.

Thus, in order to randomly mount on the board a plurality of light emitting chips with different Vf characteristics in a predetermined dispersion margin and then achieve a set current value or luminous flux value under a rated input condition, a value of a resistor that is connected in series to a plurality of light emitting chips needs to be adjusted to a value that is suitable for combined Vf characteristics of the plurality of light emitting chips.

Here, in a case where a resistor, a conductor, and a light emitting chip mounting pad or the like are formed in series in accordance with a thick film or thin film process requiring downsizing or low cost, it is difficult and unreasonable to form a resistance value that is suitable for combined Vf characteristics of a plurality of light emitting chips after a plurality of light emitting chips have been mounted on a board.

Therefore, the driving circuit 2 and the vehicle lighting device 100, in the exemplary embodiment, are reasonable because four light emitting chips 41 to 44 are mounted on a board 3 on which resistors R1 to R7, a conductor 5, and a light emitting chip mounting pad or the like are formed in series in accordance with a thick film or thin film process and then values of the resistors R1 to R7 connected in series to the four light emitting chips 41 to 44 are adjusted to a value that is suitable for combined Vf characteristics of the four light emitting chips 41 to 44.

In particular, in a case where the four lighting chips 41 to 44 are connected in series, dispersion of Vf characteristics of the individual light emitting chips is added (amplified), so that an adjustment margin of a value of a resistor provided to feed a predetermined current set for the four light emitting chips 41 to 44 (that are mounted in series) also increases to about 200% to 300%, for example. Thus, it is difficult to merely allocate a required adjustment margin in a technique of trimming a resistor that is connected in series to the four light emitting chips 41 to 44. Therefore, according to the driving circuit 2 and the vehicle lighting device 100, in the exemplary embodiment, in order to broaden a required adjustment margin, resistors targeted for opening (trimming resistors) R1, R3, R5 and resistors targeted for trimming (opening resistors) R2, R4, R6 are connected in parallel as resistors, thereby broadening the adjustment margin.

Moreover, according to the driving circuit 2 and the vehicle lighting device 100, in the exemplary embodiment, as resistors, the opening resistors R2, R4, R6 and trimming resistors R1, R3, R5 are disposed in parallel. Thus, at the time of adjusting a value of a resistor, an appropriate current (a current of a value to an extent such that a stress is not applied to the four light emitting elements 41 to 44) is fed to the four light emitting elements 41 to 44 and then combined Vf characteristics of the four light emitting elements 41 to 44 are read. First, it is judged whether or not the opening resistors R2, R4, R6 are opened, and based upon the judgment, the opening resistors R2, R4, R6 are opened or are kept unchanged as it is. Subsequently, it is judged whether or not the trimming resistors R1, R3, R5, R7 are trimmed, and based upon the judgment, the values of the trimming resistors R1, R3, R5, R7 are adjusted or are kept unchanged as it is. In this way, the driving circuit 2 and the vehicle lighting device 100, in the exemplary embodiment, are efficient, reasonable, and low in cost.

In addition, the driving circuit 2 and the vehicle lighting device 100, in the exemplary embodiment, allow a power capacitance (resistance capacitance) of opening resistors R2, R4, R6 to be smaller than that of trimming resistors R1, R3, R5. In other words, the driving circuit 2 and the vehicle lighting device 100, in the exemplary embodiment, allow the opening resistors R2, R4, R6 and the trimming resistors R1, R3, R5 to be connected in parallel, so that a current is branched into the opening resistors R2, R4, R6 and the trimming resistors R1, R3, R5. Thus, in a case where resistors having their resistance values of the same extent are connected in parallel, a power loss of a resistor is R×I×I; and therefore, the power capacitance (resistance capacitance) of the resistors targeted for opening (opening resistors) R2, R4, R6 is ¼ of that of the resistors targeted for trimming (trimming resistors) R1, R3, R5. The value of the trimming resistors R1, R3, R5 after trimmed increases; and therefore, a current that flows the opening resistances R2, R4, R6 increases accordingly and slightly increases more than the power capacitance (resistance capacitance) of ¼. In this way, the driving circuit 2 and the vehicle lighting device 100, in the exemplary embodiment, can be inexpensively manufactured because these circuit and device allow the power capacitance (resistance capacitance) of the opening resistances R2, R4, R6 to be smaller than that of the trimming resistors R1, R3, R5.

Further, according to the driving circuit 2 and the vehicle lighting device 100, in the exemplary embodiment, in a case where the opening resistors R2, R4, R6 and the trimming resistors R1, R3, R5, R7 are made of thin film resistors or thick film resistors, an area of the opening resistors R2, R4, R6 is smaller than that of the trimming resistors R1, R3, R5, R7, so that the opening resistors R2, R4, R6 can be efficiently opened, whereas the resistance value of the trimming resistors R1, R3, R5 can be efficiently adjusted.

In the exemplary embodiment, five light emitting chips 40 to 44 are used. However, in the present invention, two to four light emitting chips or six or more light emitting chips may be used. The number or layout of light emitting chips used as a tale lamp function and the number or layout of light emitting chips used as a stop lamp function are not limited in particular.

In addition, in the exemplary embodiment, light emitting chips are used for a tale stop lamp. However, in the present invention, these chips can also be used for a combination lamp other than the tale stop lamp.

Further, in the exemplary embodiment, light emitting chips are used to switch two lamps, i.e., a tale lamp and a stop lamp. However, in the present invention, these chips can be used to switch three or more lamps as well.

Furthermore, in the exemplary embodiment, five light emitting chips 40 to 44 are disposed in one line. However, in the present invention, light emitting chips may be disposed in a plurality of lines, at corners of a rectangle, or in a circular shape.

Still furthermore, in the exemplary embodiment, light distribution is controlled by means of a cover portion 12 and a lamp lens 102. However, in the present invention, light distribution may be controlled by means of at least one of the cover portion 12 and the lamp lens 102.

Yet furthermore, in the exemplary embodiment, as resistors of a stop lamp function, opening resistors R2, R4, R6 and trimming resistors R1, R3, R5 that are connected in parallel are disposed in three groups. However, in the present invention, opening resistors and trimming resistors that are connected in parallel may be disposed in one group, two group, or four or more groups. In other words, the number of groups in parallel connection between opening resistors and trimming resistors is determined depending upon a trimming allowable increment of the trimming resistor (such as resistance capacitance and the number of trimmings (partial cutouts 50)). For example, in the exemplary embodiment, a trimming allowable increment is on the order of about 30% to 50%, whereas in the present invention, if the trimming allowable increment is increased according to the resistance capacitance and the number of trimmings (partial cutouts 50) or the like, the number of groups in parallel connection between opening resistors and trimming resistors can be reduced, and a manufacturing cost can be made inexpensive accordingly.

Furthermore, in the exemplary embodiment, as a resistor of a stop lamp function, one trimming resistor R7 is connected in series at the downstream side to the opening resistors R2, R4, R6 and the trimming resistors R1, R3, R5 that are connected in parallel. However, in the present invention, this resistor may be provided at the upstream side or maybe provided between an opening resistor and a trimming resistor. Alternatively, one trimming resistor may not be provided.

Still furthermore, in the exemplary embodiment, resistors of a tale lamp function are trimming resistors R8, R9 that are connected in series. However, in the present invention, one resistor or three or more trimming resistors may be used, may be connected in parallel, or may be connected in parallel and in series.

What is claimed is:

1. A driving circuit of a semiconductor-type light source for a vehicle lighting device, the device using the semiconductor-type light source as a light source, the semiconductor-type light source comprising a plurality of light emitting chips which are mounted on a board, the plurality of light emitting chips having different forward voltage characteristics within a predetermined forward voltage characteristics range, wherein the plurality of light emitting chips are randomly mounted in a bare-chip state on the board without classifying their specific forward voltage characteristics in advance;

an opening resistor and a trimming resistor are mounted on the board and are disposed in parallel;

the resistors being configured to be opened or trimmed to provide a combined resistance value corresponding to a combined forward voltage characteristics range of the plurality of light emitting chips such that the resistors feed a current of a set predetermined value for the plurality of light emitting chips, the combined forward voltage characteristics range corresponding to a combination of the predetermined forward voltage characteristics range of the plurality of light emitting chips; and the trimming resistor is trimmed after the plurality of light emitting chips has mounted on the board.

2. The driving circuit of semiconductor-type light source for vehicle lighting device, according to claim 1, wherein the opening resistor has a power capacitance that is smaller than a power capacitance of the trimming resistor.

3. The driving circuit of semiconductor-type light source for vehicle lighting device, according to claim 1, wherein the opening resistor and the trimming resistor are made of thin film resistors or thick film resistor and, the opening resistor has an area that is smaller than an area of the trimming resistor.

4. A vehicle lighting device using a semiconductor-type light source as a light source, the vehicle lighting device comprising a lamp housing and a lamp lens that are adapted to partition a lamp room, a light source unit using the semiconductor-type light source as a light source, the semiconductor-type light source being disposed in the lamp room and made of a plurality of light emitting chips and, a driving circuit of semiconductor-type light source of vehicle lighting device, according to claim 1, the driving circuit being a driving circuit of the semiconductor-type light source of the light source unit.

5. The driving circuit of semiconductor-type light source for vehicle lighting device, according to claim 1, wherein the resistors are arranged in a plurality of groups of resistors, each group of resistors comprising at least an opening resistor and a trimming resistor disposed in parallel, the groups of resistors arranged in series.

6. The driving circuit of semiconductor-type light source for vehicle lighting device, according to claim 5, wherein the number of the plurality of groups is three, and wherein the resistors further include a trimming resistor in series with the groups of resistors.

7. A driving circuit of a semiconductor-type light source for a vehicle lighting device, the device using the semiconductor-type light source as a light source, the semiconductor-type light source comprising a plurality of light emitting chips which are mounted on a board, the plurality of light emitting chips having different forward voltage characteristics within a predetermined forward voltage characteristics range, wherein the light emitting chips are randomly mounted in a bare-chip state on the board without classifying their specific forward voltage characteristics in advance;

an opening resistor and a trimming resistor are mounted on the board and are disposed in parallel;

the resistors being configured to be opened or trimmed to provide a combined resistance value corresponding to a combined forward voltage characteristics range of the plurality of light emitting chips such that the resistors feed a current of a set predetermined value for the plurality of light emitting chips; and the trimming resistor is trimmed after the plurality of light emitting chips has mounted on the board.

8. The driving circuit of a semiconductor-type light source for a vehicle lighting device, according to claim 1, wherein the driving circuit comprises a plurality of pairs of the parallely disposed opening resistor and the trimming resistor.

9. The driving circuit of a semiconductor-type light source for a vehicle lighting device, according to claim 7, wherein the driving circuit comprises a plurality of pairs of the parallely disposed opening resistor and the trimming resistor.

* * * * *